Patented Mar. 9, 1954

2,671,757

UNITED STATES PATENT OFFICE 2,671,757

PREVENTION OF CORROSION

Thomas G. Wisherd, Tulsa, Okla., assignor, by mesne assignments, to Sinclair Oil and Gas Company, Tulsa, Okla., a corporation of Maine No Drawing. Application March 31, 1951, Serial No. 218,709

2 Claims. (Cl. 252—8.55)

My invention relates to the prevention of corrosion in oil wells. In particular, I have found that an oil soluble ammonia neutralized sulfonated mixture of polyalkylated benzenes when added to well fluids in exceedingly small proportions, acts to effectively inhibit the rusting or corroding of the metallic equipment in the well. The crude oil so produced also possesses favorable corrosion-inhibiting properties during transportation through connecting pipelines and intermediate storage to the refinery.

Some degree of corrosion takes place in the metallic equipment of practically all oil wells and in certain environments corrosion may reach costly proportions. The casing, tubing, sucker rods, and lead lines are particularly subject to corrosive effects. The sucker rods and sucker rod boxes which operate under heavy cyclic load conditions are especially susceptible to failure through corrosion fatigue. As a result of corrosion, costs may be greatly increased because of the necessity of pulling tubing and sucker rods for repair or replacement. Indirect costs in terms of production losses while shut down for repair or replacement of rods, tubing and other equipment may also prove to be considerable.

I have found that the corrosive effects of the well fluids on metallic surfaces can be substantially reduced, indeed in many cases practically eliminated, by introduction of an exceedingly minute proportion of an oil-soluble ammonia neutralized sulfonated mixture of polyalkylated benzenes. The useful materials are derived from the bottoms from the production of dodecylbenzene (Neolene) and hereafter are referred to as the ammonia neutralized sulfonated Neolene bottoms or the inhibitor. The ammonia neutralized sulfonated Neolene bottoms I use have unexpected oil solubility and are prepared by the sulfonation and subsequent ammoniation of the bottoms produced in the manufacture of monododecylbenzene, i. e., the bottoms remaining after fractionation to remove the monododecylbenzene cut from the reaction products of dodecene with benzene, which bottoms consist essentially of di-dodecylbenzene along with other polyalkylated benzene molecules. The inhibitor is added to the well fluids by conventional methods, usually by merely injecting the desired amount down the annulus between the production tubing and the casing. The effective proportion of my inhibitor is in the range approximating 0.4 to 40 pints per one thousand barrels of well fluid, i. e., crude oil and brine. The resulting crude produced from the well, after separation of the brine by conventional methods, displays favorable corrosion inhibiting properties when transported through connecting pipelines to the refinery.

The following example is offered to more clearly illustrate the effectiveness of my ammonia neutralized sulfonated Neolene bottoms. However it must be realized that the tests of the examples were run on a specific well fluid and that the extreme variations found among well fluids and the rates and conditions of production of oil wells in the same and different fields are factors to be considered in drawing any conclusion therefrom. Also it is well known that a particular inhibitor may show superior anti-corrosive properties over those shown by other corrosion inhibitors in a particular well or field and show inferior anti-corrosive properties to the same or other corrosion inhibitors in another well or field. Consequently oil well corrosion inhibitors are customarily selected for use in a particular well or field according to the conditions in that well or field, and even then the superiority of a particular inhibitor over other inhibitors is unpredictable.

I compared the ammonia neutralized sulfonated Neolene bottoms with an oil solution of a commercially used sulfonate-type inhibitor. This inhibitor, which I shall refer to as Inhibitor A, has the following test characteristics:

| | |
|---|---|
| Gravity °API | 28.0 |
| Flash °F | 385 |
| Fire °F | 445 |
| Viscosity at 100 SUS | 416 |
| Viscosity at 130 SUS | 163 |
| Viscosity at 210 SUS | 49.2 |
| Viscosity index | 90 |
| Color | 4½ |
| Nitrogen (percent) | 0.265 |
| Acid number | 9.0 |
| Sulfur (percent) | 0.60 |

*Example I*

I compared the ammonia neutralized sulfonated Neolene bottoms with Inhibitor A by means of modification of the ASTM test for Rust-Preventing Characteristics of Steam Turbine Oil in the Presence of Water D-665-47T. In the modification, a weighed test coupon was exposed in rapidly stirred well fluid or a blend of that well fluid plus an inhibitor. The inhibitor concentration was based upon total fluid (crude oil plus brine). The well fluid used was a sour West Kansas crude oil composed of 85% brine and 15% crude oil.

The test was run at room temperature for 48 hours after which the test coupons were removed from the test solutions, cleaned to remove corrosive products, and reweighed. Corrosion losses were expressed as mg. of corrosion per square decimeter of surface per day (mdd). The results, which follow, show that the activity of the ammonia neutralized sulfonated Neolene bottoms is approximately 5 times as great as that of Inhibitor A.

| Sulfonated Bottoms, Concentration, Wt. Percent [1] | Inhibitor A Concentration, Wt. Percent [1] | Corrosion Rate (mdd) |
|---|---|---|
| None | None | [2] 123 |
| .004 |  | 78 |
| .004 |  | 60 |
| .01 |  | 23 |
| .01 |  | 18 |
| .01 |  | 22 |
|  | .02 | 92 |
|  | .02 | 87 |
|  | .05 | 24 |
|  | .05 | 27 |

[1] Based on total fluid.
[2] Average of many tests.

Besides affording protection against corrosion, the ammonia neutralized sulfonated Neolene bottoms are characterized by considerable ease in handling and do not have any toxic or other injurious effects on personnel. Moreover, oil production is not interfered with, such as by the formation of undesirable clogging or contaminating materials either at the well or later at the refinery. Furthermore the essential ingredient of my composition, i. e., the by-product bottoms from the manufacture of dodecylbenzene, and the materials necessary for the treatment of the bottoms can be obtained commercially at low cost.

In the practice of my invention, I customarily dilute the acid sulfonated bottoms with isopropanol, water, and a non-volatile highly aromatic petroleum solvent before the neutralization with anhydrous ammonia. However, the amount and type of diluent added to the acid sulfonates prior to neutralization is not an essential part of the product and may be varied as desired or eliminated entirely depending upon the mode of using the sulfonates.

Tests and the compositions of three typical concentrates follow:

| Pour, °F | | −25 | |
|---|---|---|---|
| Nitrogen, Percent | 2.83 | 2.24 | 2.12 |
| Sulfur, Percent | 4.68 | 4.52 | 4.57 |
| Acid No | 70.3 | 90.2 | 77.3 |
| Saponification No | 99.7 | 96.6 | 86.8 |
| Ash, Percent | .278 | .002 | .013 |

As I have stated, the amounts of ammonia neutralized sulfonated bottoms employed are between 0.4 to 40 pints per thousand barrels of well fluid. Less than the minimum amount is generally ineffective in substantially reducing corrosion effects while over 40 pints per one thousand barrels is unnecessary and wasteful of the inhibitor. Since my ammonia neutralized sulfonated Neolene bottoms are readily oil soluble, and not readily water soluble, the greater portion is expected to go into the crude oil rather than to remain in and to be drawn off with the brine. Some inhibitor is undoubtedly left on well surfaces, on the surfaces of rust or other suspended solid particles, and some is lost in the brine. However, its concentration in crude oil can be relatively high as the oil is pumped through crude lines after separation of the brine. For example, an oil well using two quarts of inhibitor and producing 300 barrels of brine and 15 barrels of oil daily would be using 38 p. p. m. of inhibitor based on well fluid or 800 p. p. m. based on oil. Generally, I contemplate treating wells producing "sour" crudes, that is well fluids containing relatively large amounts of sulfur or sulfur compounds, since such wells present the most severe corrosion problems.

The actual amount of inhibitor employed within the above range is ordinarily directly related to the corrosiveness of the well fluid, the resistance of the metallic surfaces to corrosion and the production rate. In particular, flow interruptions and varying temperatures and pressures are capable of affecting corrosion considerably. Of course the actual measure of corrosion, and therefore regulation of inhibitor concentration, can be determined in the last analysis by the actual deterioration in the physical condition of the metallic surfaces involved. However, it may not be practical to rely on such visual inspections since the damage is then already effected. Accordingly, metal test blanks may be used for insertion into the well fluid stream and removed and examined at periodic intervals. Direct measurement of the well fluid acidity is also possible. Or a measure of the iron content may be made since this is an indication of the metal lost through corrosion.

An illustration of the method of preparation of my novel ammonia neutralized sulfonated Neolene bottoms is presented in the following example.

*Example II*

The bottoms from the production of dodecylbenzene which I employed in producing this particular concentrate were "Neolene 400 Bottoms" obtained commercially from Sharples-Continental Corporation. Typical physical properties of "Neolene 400 Bottoms" are as follows:

Engler range:

| IBP | °F | 644 |
|---|---|---|
| 1% | °F | 671 |
| 2 | °F | 685 |
| 3 | °F | 690 |
| 4 | °F | 695 |
| 5 | °F | 698 |
| 20 | °F | 723 |
| 50 | °F | 739 |
| 70 | °F | 753 |
| 90 | °F | 775 |
| 92 | °F | 777 |
| 93 | °F | 778 |
| 94 | °F | 779 |
| 96 | °F | 780 |
| 97 | °F | 780 |
| 98 | °F | 780 |
| FBP | °F | 780 |
| Percent rec. | °F | 99 |

Spec. gravity at 100° F. _____ 0.8639
Spec. gravity at 130° F. _____ 0.8545
Viscosity in centipoises at 130° F. ____ 45.8
Color _____ Dark brown
Molecular weight _____ 403±15

"Neolene 400 Bottoms" were charged in the amount of 1888 pounds to a conventional type Monel sulfonator and sulfonated by the addition of commercial 20% oleum totaling 1782 pounds. The mass was agitated continuously during the addition of the oleum and the temperature was held to a maximum of 147° F. by the circulation of cooling water through continuous coils located in the acid mass, and by the rate of oleum addition. The total time required for oleum application was 50 minutes.

The acid mass was next washed by the gradual application of 1335 pounds of water. Agitation was continued during the washing operation and until the sulfonated bottoms-diluted acid mass was pumped to the settler. Due to the heat evolved by dilution of the partially spent oleum during the washing operation the temperature rose rapidly. The washing temperature was held to a maximum of 196° F. by controlling the rate of addition of the water and by means of the cooling coils. The time required for the washing operation was 90 minutes and the final temperature was 185° F. The washed sulfonated mixture was then pumped to a glass-lined, water-jacketed settling tank which had been brought to 185° F. by injecting steam into the water in the jacket. The mass was allowed to settle without any further application of heat for a period of 16 hours. At the end of the 16 hour settling period the temperature of the mass was 152° F.

The diluted acid was now drawn from the bottom of the settler and discarded. The acid sulfonates, containing only a small amount of dilute sulfuric acid, were drawn to a neutralizing vessel and diluted with 18 gallons of 99% isopropanol, 18 gallons of water, and 35 gallons of non-volatile, highly aromatic petroleum solvent. The diluted acid sulfonates were neutralized by the addition of 122 pounds of anhydrous ammonia, and the finished product drawn to drums for storage. The yield was 356 gallons. The material produced by the above process may or may not contain some excess ammonia. It is a semi-viscous fluid at atmospheric temperatures and is miscible in all proportions with paraffinic petroleum oils such as kerosine and low viscosity white oils.

I claim:

1. In the production of oil from wells wherein a stream of well fluid is withdrawn from an oil well in contact with metallic surfaces, the method of reducing the corrosive effect of said well fluid upon such metallic surfaces which comprises introducing into the stream of well fluid ammonia neutralized sulfonated bottoms produced in the manufacture of dodecylbenzene which bottoms consist essentially of didodecylbenzene and other polyalkylated benzenes in the amount of 0.4 to 40 pints per thousand barrels of well fluid.

2. Crude oil to which favorable rust inhibiting properties have been imparted by the addition of 0.4 to 40 pints per one thousand barrels of well fluid of ammonia neutralized sulfonated bottoms from the production of dodecylbenzene which bottoms consist essentially of didodecylbenzene and other polyalkylated benzenes.

THOMAS G. WISHERD.

References Cited in the file of this patent
UNITED STATES PATENTS

| Number | Name | Date |
|---|---|---|
| 2,422,515 | Anderson | June 17, 1947 |
| 2,509,786 | Schiermeier et al. | May 30, 1950 |
| 2,545,138 | Chester | Mar. 13, 1951 |